United States Patent
Eriksson

[15] 3,656,858
[45] Apr. 18, 1972

[54] SCREW THREAD CUTTING APPARATUS

[72] Inventor: Alf A. A. Eriksson, Nacka, Sweden
[73] Assignee: Aktiebolaget Svenska Precisionsverktyg, Nacka, Sweden
[22] Filed: Dec. 3, 1969
[21] Appl. No.: 881,683

[30] Foreign Application Priority Data
Dec. 16, 1968 Sweden..................................17220/68

[52] U.S. Cl..................................408/139, 10/129, 10/141
[51] Int. Cl.........................................B23g 1/00, B23g 5/14
[58] Field of Search ..............10/89 F, 89 H, 129, 135, 141 H; 408/124, 129, 139, 141

[56] References Cited

UNITED STATES PATENTS

| | | |
|---|---|---|
| 2,592,103 | 4/1952 | Alfredeen..............................10/135 |
| 3,032,156 | 5/1962 | Eriksson................................10/135 |
| 3,178,739 | 4/1965 | Plummer et al........................10/129 |
| 3,220,030 | 11/1965 | Supernor..............................10/129 |
| 3,325,837 | 6/1967 | Hartmann..............................10/135 |
| 3,521,314 | 7/1970 | Steiner..................................408/139 |

Primary Examiner—Charles W. Lanham
Assistant Examiner—E. M. Combs
Attorney—Shlesinger, Fitzsimmons & Shlesinger

[57] ABSTRACT

In this apparatus the driving and driven parts are mounted for axial movement relative to one another, but are held resiliently in axial positions of rest by compression and tension springs, respectively. The compression spring is mounted in the driven part between a sleeve reciprocably mounted on the inner end of the driven part, and a plug adjustably threaded in the outer end of the driven part, so that by inserting a tool into the outer end of the driven part, the plug can be adjusted to vary the tension in the compression spring. The tension spring is also attached at one end to this plug so that its tension is adjusted simultaneously with that of the compression spring.

2 Claims, 2 Drawing Figures

SCREW THREAD CUTTING APPARATUS

This invention relates to screw thread cutting apparatus.

More particularly this invention relates to a screw thread cutting apparatus which is provided with a driving part and a driven part and torque transmitting members interposed therebetween which allow axial displacement of said parts relative one another, spring members being disposed between the parts, of which members a compression spring is subjected to tension by displacement of the parts in a direction towards one another and another spring, primarily a tension spring, in opposite direction.

It is known from the U.S. Pat. No. 3,325,837 how to adjust by means of a tool the displacement of two such parts relative to one another in a direction away from and towards one another without necessitating disassembly of the apparatus. As a result the collaring pressure, which comes into existance when the screw tap is to commence a screw threading operation, can be varied within wide limits, and further the axial displacement between the two parts of the apparatus can be adapted in the direction towards and away from the work piece in response to varying conditions of operation.

One main object of the invention is to provide an improvement in screw thread cutting apparatus of the type under consideration so that they can be employed universally for most drilling operations, such as screw cutting in series in two or more stages while making sure that the tap each time is fitted into the thread already cut and thus the cutting of double screw threads is avoided. A screw thread cutting apparatus is usually equipped with a coupling which is released when the torque on the screw tap exceeds a predetermined value, e.g. when the tap has reached the bottom of a dead end bore while the driving part of the screw thread cutting apparatus continues the downward movement. When the screw tap then is screwed upwards out of the hole it will exercise pressure on the uppermost thread until the driven part has regained its normal axial position relative to the driving part as it had been before the release had taken place. This results in that the uppermost thread can be damaged. In these cases it is necessary that the collaring pressure on the screw tap be relatively low.

A further object of the invention is to provide a screw thread cutting apparatus which is capable in a satisfying manner of performing often recurring working operations, for which it is essential that the screw tap begins with its screw cutting activity or "penetrates" into the drilled hole in a predetermined position as soon as the screw tap on its way down establishes contact with the mouth of the hole. In such cases it should be possible to adjust the apparatus to a relatively high collaring pressure.

According to one main feature of the invention there are disposed between the parts elements which are adapted to allow adjustment in the tension of the compression spring without effecting any change in the positions of the two parts from their initial positions. In this connection preferably at least one element is adapted to have its axial position changed by a turning movement relative to the part carrying the same. According to an important embodiment of the invention the compression spring has its two ends mounted on the driven part and at least one element carried by the same. One of the elements may be constituted by a spacing member which to a limited extent is movable relative to the driven part in a direction towards the driving part and against which one end of the compression spring is seated.

Further objects and advantages of the invention will become apparent from the following description, considered in connection with the accompanying drawings, in which.

Figure 1:
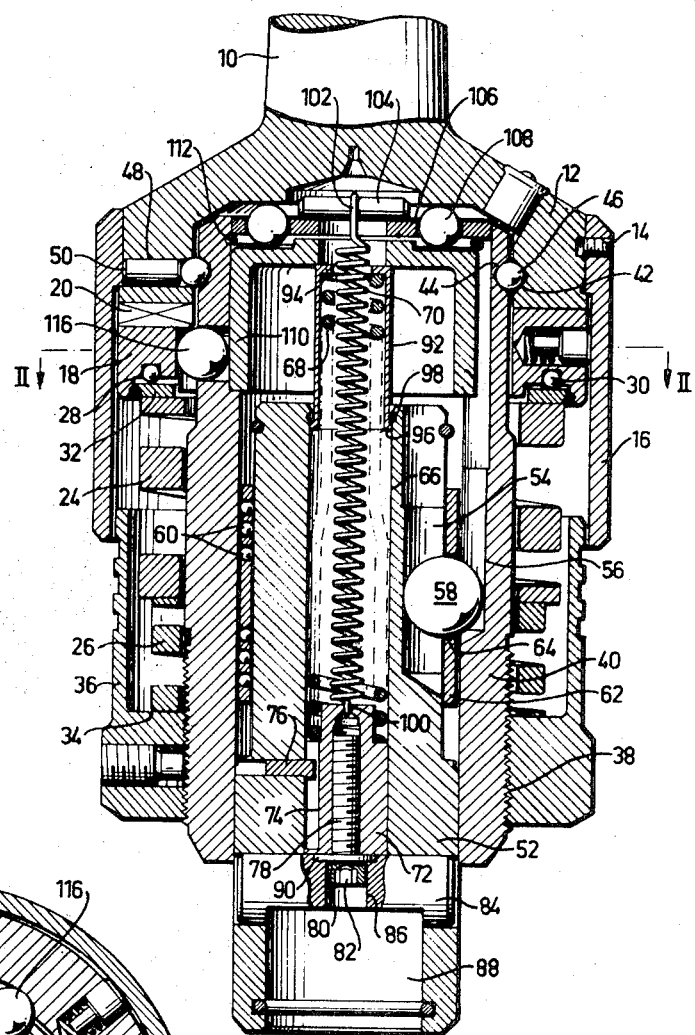
FIG. 1 is an axial sectional view of a screw thread cutting apparatus embodying the features of the invention.

Referring to the drawings, reference numeral 10 denotes a driving spindle, the lower end portion of which is formed as head portion 12, against the outer cylindrical wall surface of which a cylindrical sleeve 16 is pressed and retained in this position by a screw 14. Formed between the head portion 12 and a coaxial annular or sleeve element 18 is an overload coupling 20 consisting of projections or shoulders engaging one another in a manner known per se. This annular element 18 is actuated for such engagement between the projections by means of two spring members 24, 26 which are active between a ring 32 mounted by means of balls 30 seated on the lower face of the ring 18 within an annular groove 28, and an inwardly directed annular flange 34 of a lower sleeve 36. The annular flange 34 is formed with an inner screw thread 38 which is in engagement with a corresponding outer screw thread on the lower portion of a cylindrical guide body 40 projecting into the sleeves 16, 36, and which at its upper end is rotatably, but axially stationarily connected with the head portion 12. This connection is by means of two annular grooves 42, 44 facing one another and formed on, respectively, the inner wall of the head portion 12 and the outer wall of the guide body 40 and into which grooves a number of balls 46 has been inserted. For introduction of the balls a channel 48 is formed in the wall of the head portion, which channel after the introduction of the balls 46 is closed by means of a plug 50.

Mounted in bearings within the sleeve-formed guide body 40 is a cylindrical slide body 52 which will be denominated the driven part of the apparatus. The bodies 40 and 52 are axially displaceable to a limited degree, but rotationally stationary relatively to one another. For this purpose the slide body 52 is provided with an external axial groove 54 and the guide body 40 with a corresponding internal axial groove 56. Inserted into these grooves 54, 56 is a ball 58 which thus transmits torque between the bodies 40, 52 but allows the axial movement thereof relative one another. The mounting in bearings between the said bodies is brought about by means of a great number of balls 60, which are inserted in a sleeve shaped ball retainer 62, which in addition is provided with an opening 64 for the ball 58.

Disposed concentrically in a central bore 66 in the slide body 52 are two spring members, viz. firstly a compression spring 68 and secondly a spring 70, preferably formed as a tension spring. The compression spring bears at one end on an element 72 which is axially displaceable but non-rotatable within the slide body 52. The element 72, which with a sliding fit enters into the bore 66, has an axial groove 74 into which a locking pin 76 projects. Further the element 72 has a central thread for a screw 78, the head 80 of which has a recess 82 such as of hexagonal shape, so that the screw can be rotated by means of a tool inserted from outside into said recess. A transverse pin 84 has a central recess 86 for the head 80. The tool can be introduced into the recess 82 from the lower end of the apparatus after the holder (not shown) for the screw tap has been removed from an axial bore 88 in the end portion of the driven part or slide body 52. The screw 78 has a flange 90 which enters into and bears on a corresponding shoulder in the tap 84.

A suitably sleeve-shaped spacing member 92 has an internal collar 94 against which the other end of the compression spring 68 may bear. The spacing sleeve 92 is further formed with an outer flange 96 which cooperates with a stopper member, such as a locking ring 98 in the slide body 52, which member limits the movement of the spacing sleeve 92 in an outward direction away from the slide body.

The tension spring 70 has its lower end portion 100 fixed by hooking it in the element 72, and has its upper end portion 102 hooked over a pin 104 which rests against a disc 106 which serves as guide for balls 108. These balls are disposed between the head 12 of the apparatus and a hood-shaped element 110 to allow a relative rotation between these parts under transmission of pressure. Provided between the disc 106 and the guide body 40 is a locking ring 112.

The slide body 52 and elements connected thereto are suspended by the tension spring 70 which thus is subjected to tension when the slide body is drawn out away from the driving part, and vice versa. A relative movement between these parts can take place thanks to the ball 58 and the grooves 54, 56 while the torque is transmitted between the parts. The compression spring 68 extends between the element 72 and the collar 94 of the spacing sleeve 92. In the setting of the apparatus shown in FIG. 1, the element 72 is shown in its lowermost end position. This means that the compression spring 68 is at its maximum length and extended as far as is possible with only some initial tension or no initial tension at all. On the other hand the tension spring 70 assures that the spacing sleeve 92 bears on the hood-shaped part 110 which is associated with the driving part of the apparatus and which through the balls 108 bears against the head 12.

By turning the screw 78 by means of a tool inserted from outside into the head 80 thereof, the compression spring 68 can be pre-stressed to a more or less degree, whereunder it continuously keeps the spacing sleeve 92 in its drawn-out or extended position in which it bears against the flange 96 and the locking ring 98. Since the spacing sleeve 92 is at the same time kept by the tension spring 70 against the hood-shaped part 110, it is ensured that the normal axial positions of the driving part and the driven part of the apparatus for the positions of rest that these parts normally assume as illustrated in FIG. 1, will remain unchanged regardless of any change in the degree of tension in the compression spring 68. The pressure exerted by the compression spring is thus taken up within the driven part 52 and its two elements 72, 92. It is easily understood that to the same degree as the element 72 is displaced upwardly, the initial tension of the tension spring 70 will be reduced.

The driven part 52 has freedom of motion in an inward direction or so-called "reward-floating" which is constant and the magnitude of which is defined by the length of the sleeve 92 which extends above the driven part. This means that the driven part 52 with its screw tap always will take the same axial starting or neutral position relative to the driving part of the apparatus independent of the degree of initial tension of the compression spring 68 which in turn is adjust in response to the premises which exist for the carrying out of various working operations, the degree of hardness of the work piece etc.

The driven part 52 can also move in an outward direction, "forward-floating," whereupon the spacing sleeve 92 leaves the portion 110 of the driving part and the tension spring 70 is stretched. In contrast the length of the compression spring 68 remains in this case unchanged and consequently also the degree of collaring pressure.

Figure 2:
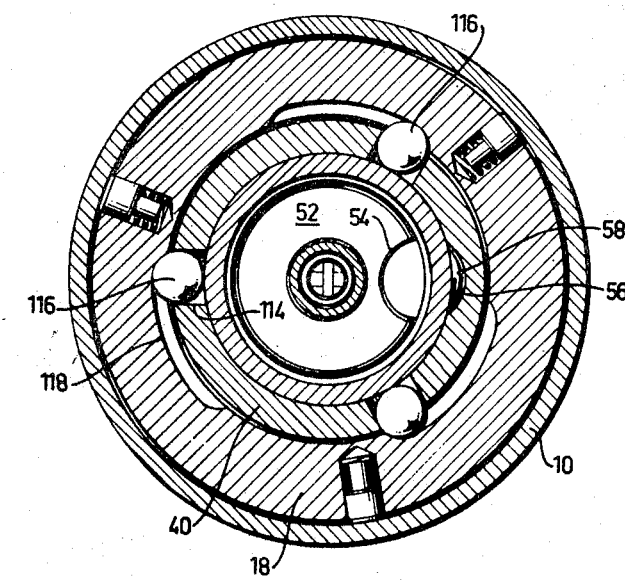
FIG. 2 is a sectional view following line II—II of FIG. 1 and looking in the direction of the arrows.

When the driving spindle 10 is caused to rotate, the torque is transmitted from the element 12 through the coupling 20 to the annular element 18. To transmit the torque further from said latter element to the guide body 40 said body is in the embodiment shown formed with three peripherally equally distributed radial bores 114 (FIG. 2) which receive locking members, e.g. in the form of the balls 116, which are kept by the rotatable hood-shaped part 110 partly projecting from the bores 114 and each of which engages a recess or peripheral groove 118. The grooves 118 are formed at the inner surface of the annular element 18. The balls 116 transmit the torque from the annular element 18 to the guide body 40 and therefrom the torque is transmitted by the ball 58 to the driven part 52 which drives the screw tap. If now the torque on the driven part should be too great, so that the coupling 20 is released, the annular element 18 is guided downwards while the springs 24, 26 are compressed. Thereby the balls 116 are caused to change their axial position so that they take up the load from said springs as explained in more detail in the U.S. Pat. No. 3,032,156.

The setting of the element 72 for varying the degree of compression of the spring 68 may be brought about by a kind of bayonet joint, so that the element can take two positions, for example. The liberty of axial backward movement of the driven part can be varied by employing spacing sleeves 92 of different lengths. In certain cases the elements 72, 78 may be replaced by a simple retaining device easily applicable from outside, e.g. a split pin for the tension spring 70, which pin at the same time forms a stopper for the compression spring 68. Upon removal of this device which may be done without disassembling the driven part 52 from the apparatus, the spacing between the points of abutment of the compression spring 68 i.e. the degree of initial tension thereof, can be varied e.g. by insertion of particular spacing members between the spring and one of these stoppers, or the collar 94 of the spacing sleeve 92 positioned inside of the bore 66 may be prolongated in inward direction. The spring 70 may be a compression spring.

While one more or less specific embodiment of the invention has been shown and described, it is to be understood that this is for purpose of illustration only, and that the invention is not to be limited thereby, but its scope is to be determined by the appended claims.

What is claimed is:

1. A screw thread cutting apparatus comprising
   a driving part,
   a driven part,
   a torque transmitting member interposed between said parts,
   said driven part having its inner end coupled to said driving part and an outer end adapted to hold a removable tool,
   a compression spring disposed between said parts to resist displacement of said parts toward one another,
   a tension spring connecting said parts and resisting movement of said parts away from one another,
   a pair of elements mounted on said driven part and engaged with opposite ends, respectively, of said compression spring to support said compression spring on the driven part,
   one of said elements being reciprocably mounted on said inner end of said driven part in engagement with said driving part to transmit the resistance of said compression spring to said driving part, and
   the other of said elements being adjustably mounted in said outer end of said driven part for axial adjustment toward and away from said compression spring to adjust the tension therein,
   said compression spring being operative to maintain said one element in one of its limit positions, when said parts are in normal positions, whereby said parts will remain in the last-named positions upon adjustment of said other element.

2. A screw thread cutting apparatus as claimed in claim 1, wherein
   said tension spring is fastened at one end to said driving part and at its opposite end to said other element, whereby adjustment of one of said springs also effects adjustment of the other spring.

* * * * *